US012734646B2

(12) United States Patent
Bacher et al.

(10) Patent No.: US 12,734,646 B2
(45) Date of Patent: Sep. 15, 2026

(54) TONGS

(71) Applicant: MASONTOPS IP HOLDINGS INC., Toronto (CA)

(72) Inventors: Michael Bacher, Toronto (CA); Philip Baron, Toronto (CA); Brett Molnar, Toronto (CA)

(73) Assignee: MASONTOPS IP HOLDINGS INC., Toronto (CA)

( * ) Notice: Subject to any disclaimer, the term of this patent is extended or adjusted under 35 U.S.C. 154(b) by 565 days.

(21) Appl. No.: 18/241,638

(22) Filed: Sep. 1, 2023

(65) Prior Publication Data

US 2024/0075590 A1 Mar. 7, 2024

Related U.S. Application Data

(63) Continuation-in-part of application No. 29/851,919, filed on Sep. 1, 2022, now Pat. No. Des. 1,058,800.

(Continued)

(51) Int. Cl.
*B25B 7/02* (2006.01)
*B25B 7/00* (2006.01)

(Continued)

(52) U.S. Cl.
CPC .................. *B25B 7/08* (2013.01); *B25B 7/02* (2013.01); *A47J 43/283* (2013.01); *B25B 7/00* (2013.01); *F24B 15/10* (2013.01)

(58) Field of Classification Search
CPC ........... B25B 25/005; B25B 7/02; B25B 7/18; B25B 7/00; B25B 7/08; B25B 7/04; A47J 43/283; F24B 15/10

(Continued)

(56) References Cited

U.S. PATENT DOCUMENTS 4,708,034 A * 11/1987 Oetiker ..................... B25B 7/00 81/9.3
4,724,729 A * 2/1988 Oetiker ................. B25B 25/005 81/9.3

(Continued)

FOREIGN PATENT DOCUMENTS

GB 2322325 A * 8/1998 ............... B25B 7/02

OTHER PUBLICATIONS

KABIN Fire Tongs Precision Log Handlers Found at: https://www.amazon.com/live/video/0b71683a676e4ac08117b63ff879a312 (Year: 2026).*

*Primary Examiner* — Mahdi H Nejad

(74) *Attorney, Agent, or Firm* — MCANDREWS HELD & MALLOY, LTD

(57) ABSTRACT

An apparatus comprises: a first handle including a coupling region having an aperture; a first jaw, wherein the proximal region of the first jaw comprises a coupling region including at least one aperture; a first linking portion, including a proximal and distal regions with coupling regions and apertures; a second jaw, a second linking portion, and a second handle in a similar arrangement; a fastener configured to nonmovably secure the first handle and the first linking portion; a fastener configured to pass through the first jaw, the first linking portion, the second jaw, and the second linking portion, such that the first jaw and the first linking portion are secured with each other, the second jaw and the second linking portion are secured with each other, and the first linking portion and the second linking portion are movably secured with each other.

20 Claims, 6 Drawing Sheets

Related U.S. Application Data

(60) Provisional application No. 63/403,172, filed on Sep. 1, 2022.

(51) Int. Cl.
*B25B 7/08* (2006.01)
*A47J 43/28* (2006.01)
*F24B 15/10* (2006.01)

(58) Field of Classification Search
USPC .............. D23/403; D8/4; 72/409.01; 29/268; 294/11
See application file for complete search history.

(56) References Cited

U.S. PATENT DOCUMENTS

| | | | | | |
|---|---|---|---|---|---|
| 4,751,668 | A * | 6/1988 | Aihara | G04G 11/00 | 708/169 |
| 4,754,668 | A * | 7/1988 | Oetiker | B25B 7/18 | 29/268 |
| D848,807 | S * | 5/2019 | Chen | D8/52 | |
| D1,058,800 | S * | 1/2025 | Bacher | B25B 7/08 | D23/403 |
| 2015/0202745 | A1 * | 7/2015 | Chen | B25B 7/08 | 81/319 |

* cited by examiner 100
123
113
133
133
137
135
122
112
134
136
131
132
115
111
121

100
123
113
133
133
135
137
122
112
136
134
144
142
132
131
115
143
141
121
111

TONGS

CROSS REFERENCE TO RELATED APPLICATIONS

The present application claims priority to U.S. Prov. Appl. No. 63/403,172, filed on Sep. 1, 2022, and U.S. application Ser. No. 29/851,919, filed on Sep. 1, 2022, the entireties of which are incorporated by reference herein.

BACKGROUND

The present disclosure relates to tongs, such as tongs used for moving fuel, such as wood, in a fire.

Figure 1:
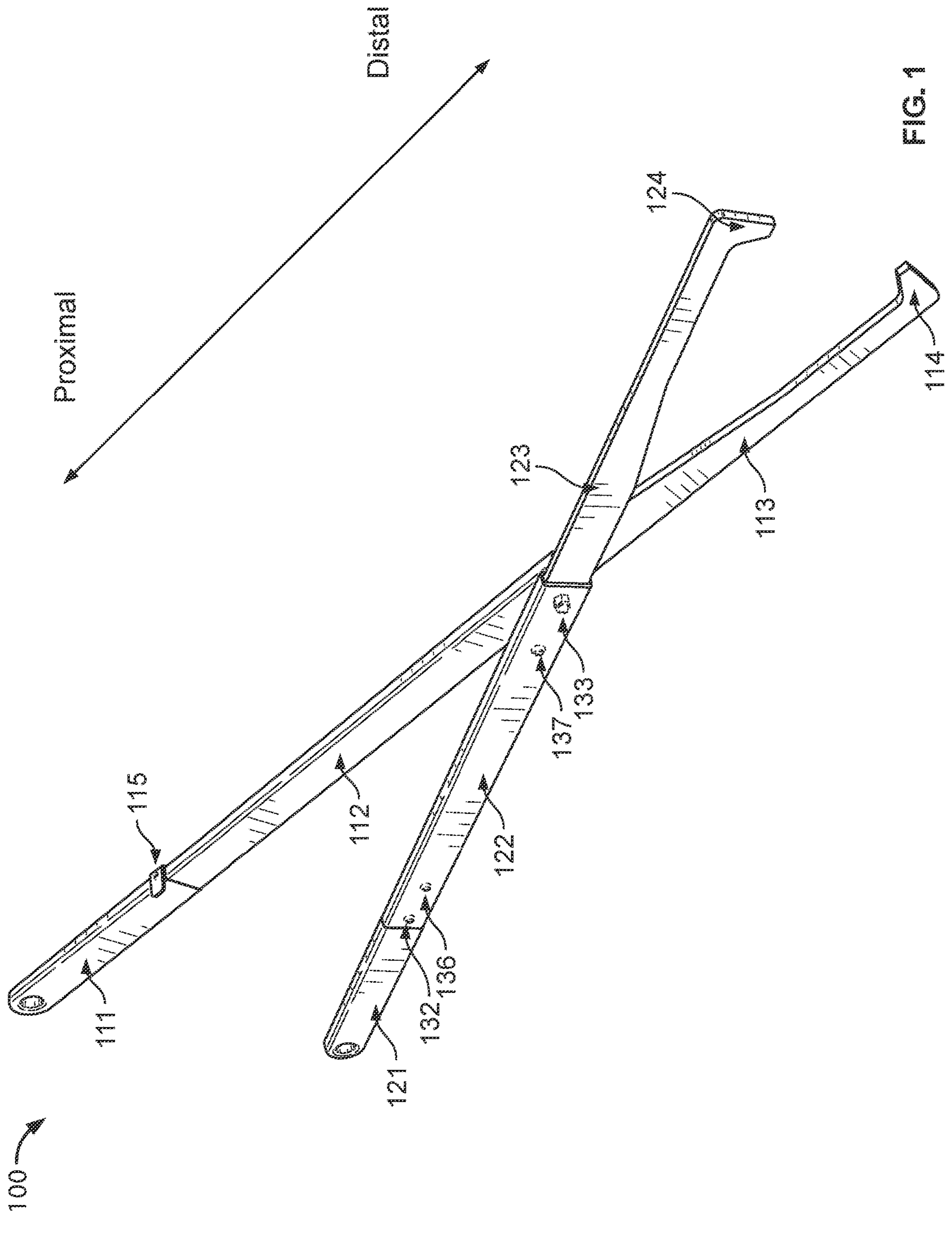
FIG. 1 is a front perspective view of an embodiment of the tongs.
Figure 2:
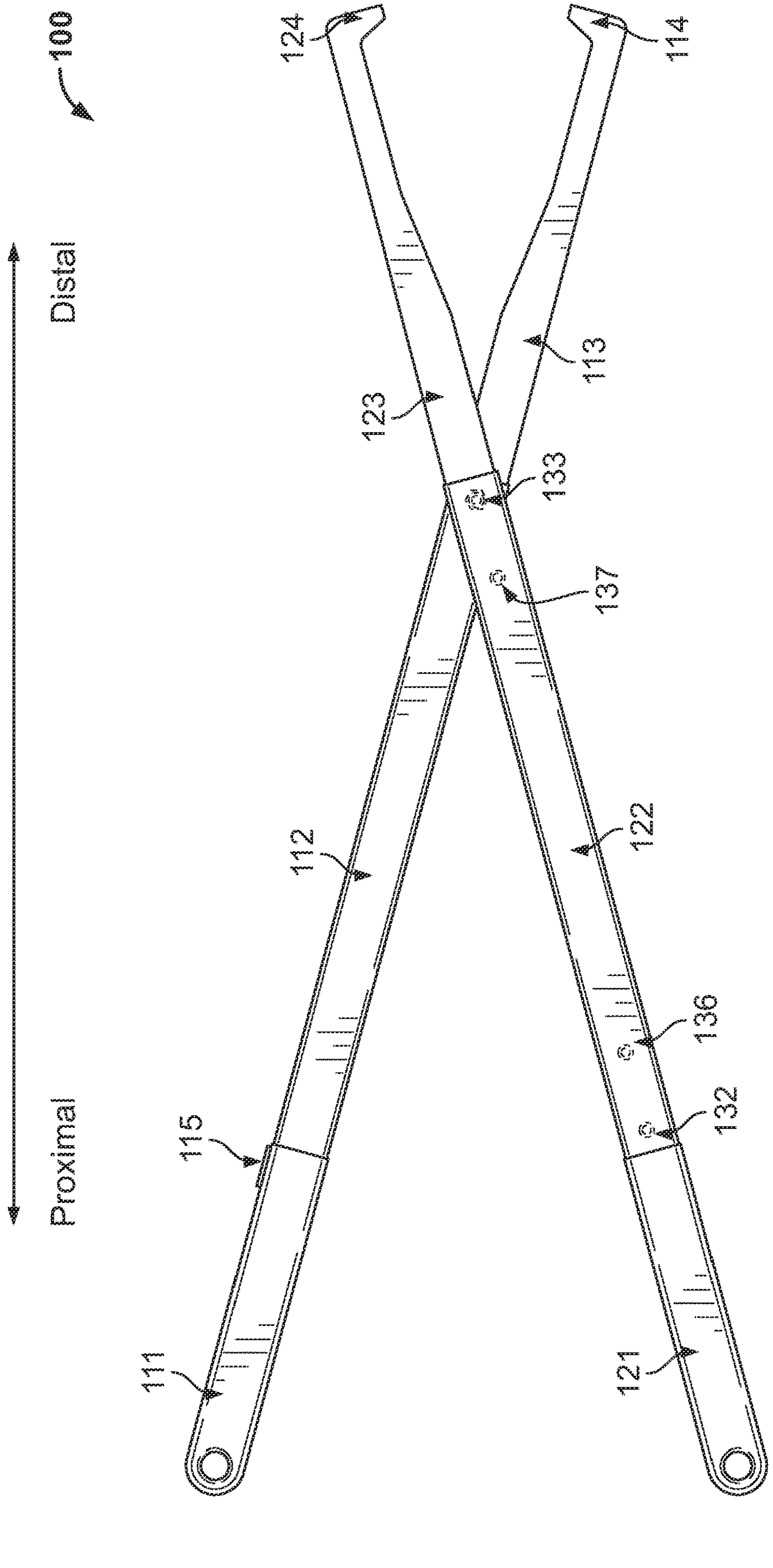
FIG. 2 is a front elevation view of an embodiment of the tongs.
Figure 3:
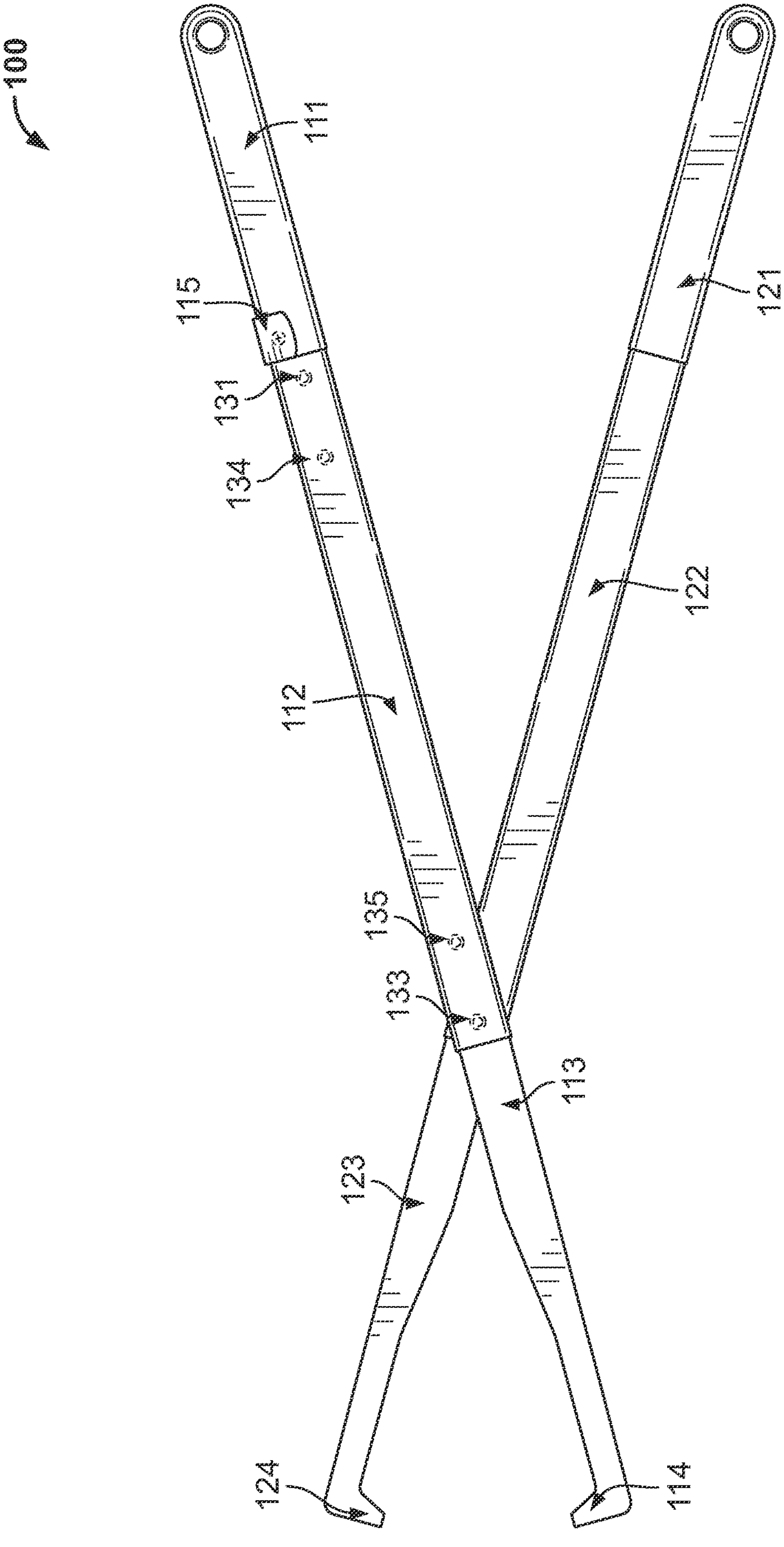
FIG. 3 is a rear elevation view of an embodiment of the tongs.
Figure 5:
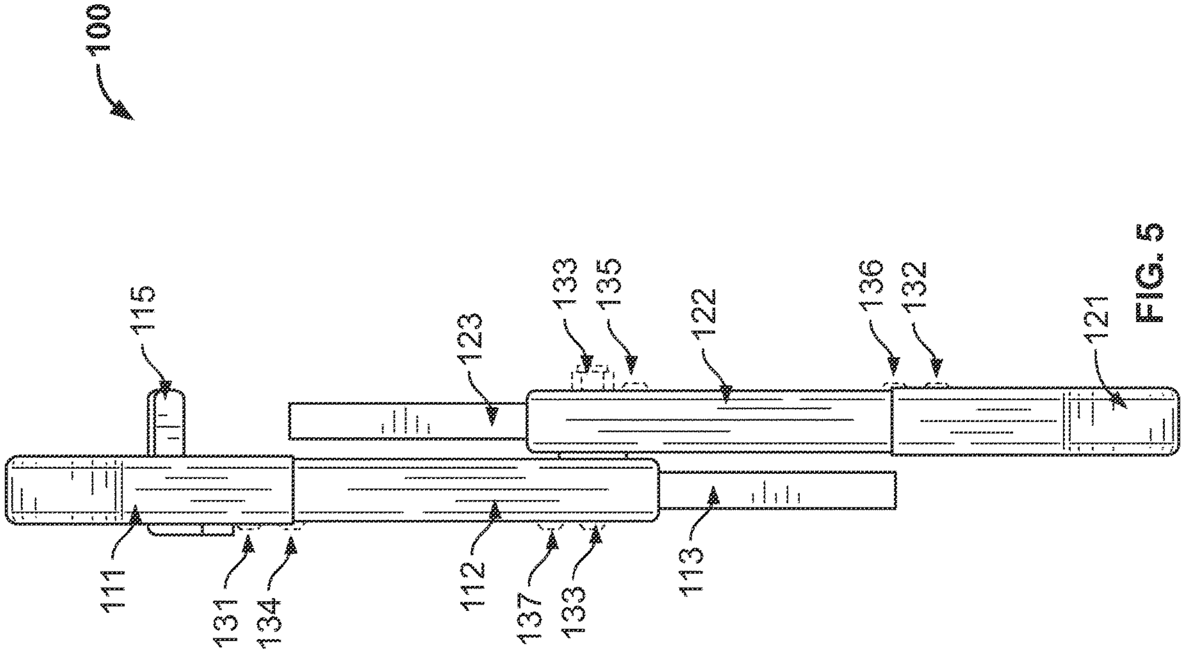
FIG. 5 is a left side elevation view of an embodiment of the tongs.
Figure 4:
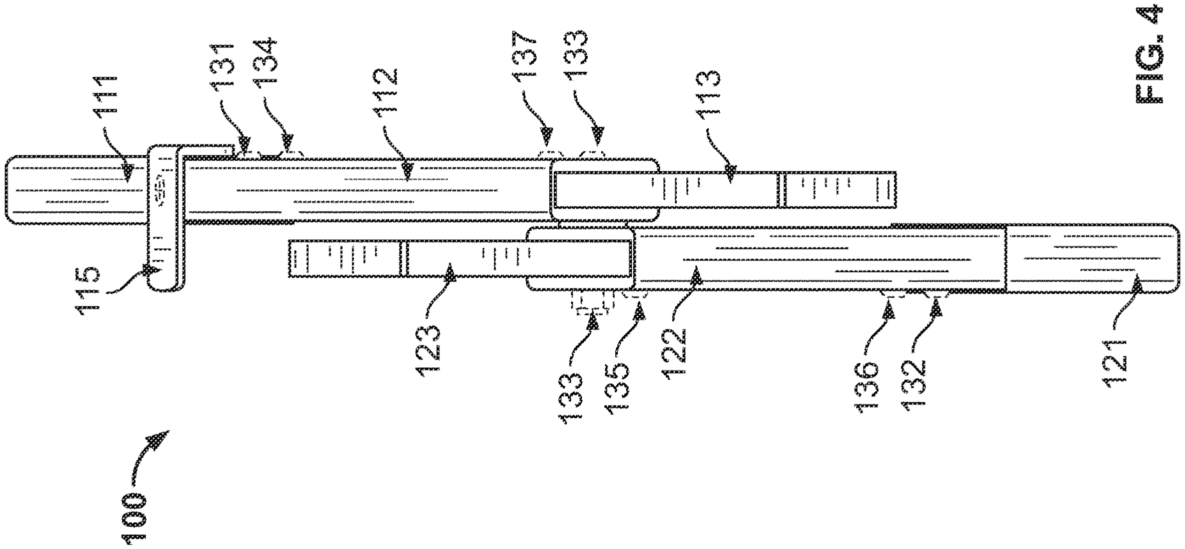
FIG. 4 is a right side elevation view of an embodiment of the tongs.
Figure 6:
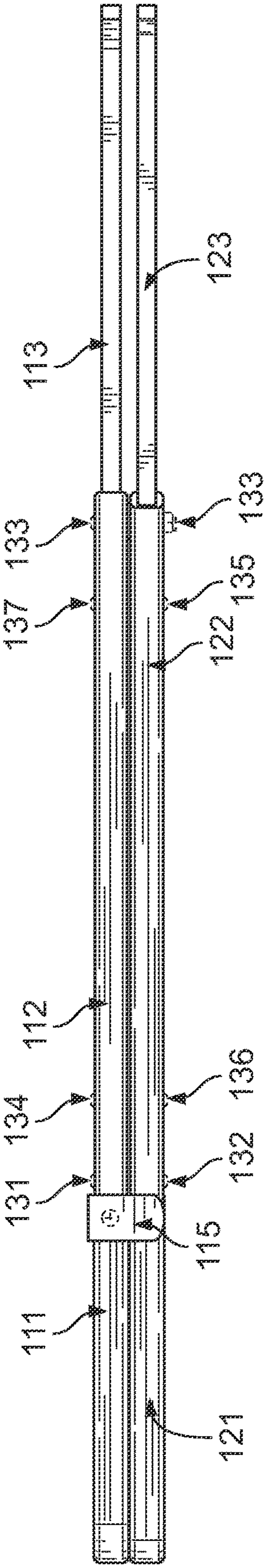
FIG. 6 is a top plan view of an embodiment of the tongs.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

SUMMARY

According to embodiments, an apparatus comprises: a first handle, including a proximal region and a distal region, wherein the first handle includes a gripping region towards the proximal region of the first handle and a coupling region towards the distal region of the first handle, wherein the gripping region of the first handle is configured to be gripped by a hand, and wherein the insertion region of the first handle comprises at least one aperture; a first jaw, including a proximal region and a distal region, wherein the proximal region of the first jaw comprises an insertion region including at least one aperture, wherein the distal region of the first jaw comprises a fuel-engaging feature; a first linking portion, including a proximal region including a coupling region and a distal region including a coupling region, wherein the proximal region of the first linking portion comprises at least one aperture, wherein the distal region of the first linking portion comprises at least one aperture; a first fastener configured to simultaneously pass through the at least one aperture of the first handle and the at least one aperture of the proximal region of the first linking portion, such that the first handle and the first linking portion are secured with each other; a second handle, including a proximal region and a distal region, wherein the second handle includes a gripping region towards the proximal region of the second handle and a coupling region towards the distal region of the second handle, wherein the gripping region of the second handle is configured to be gripped by a hand, and wherein the insertion region of the second handle comprises at least one aperture; a second jaw, including a proximal region and a distal region, wherein the proximal region of the second jaw comprises an insertion region including at least one aperture, wherein the distal region of the second jaw comprises a fuel-engaging feature; a second linking portion, including a proximal region including a coupling region and a distal region including a coupling region, wherein the proximal region of the second linking portion comprises at least one aperture, wherein the distal region of the second linking portion comprises at least one aperture; a second fastener configured to simultaneously pass through the at least one aperture of the second handle and the at least one aperture of the proximal region of the second linking portion, such that the second handle and the second linking portion are secured with each other; and a third fastener configured to simultaneously pass through the at least one aperture of the first jaw, the at least one aperture of the distal region of the first linking portion, the at least one aperture of the second jaw, the at least one aperture of the distal region of the second linking portion, such that the first jaw and the first linking portion are secured with each other, the second jaw and the second linking portion are secured with each other, and the first linking portion and the second linking portion are movably secured with each other. According to an embodiment, the coupling region of the first handle comprises an insertion region, the coupling region of the second handle comprises an insertion region, the coupling region of the proximal region of the first linking portion comprises a hollow region, the coupling region of the distal region of the first linking portion comprises a hollow region, the coupling region of the proximal region of the second linking portion comprises a hollow region, the coupling region of the distal region of the second linking portion comprises a hollow region, the coupling region of the first jaw comprises an insertion region, and the coupling region of the second jaw comprises an insertion region. According to an embodiment, the first handle comprises a step that determines the distance that the insertion region of the first handle can be inserted into the hollow region of the proximal region of the first linking portion, and the second handle comprises a step that determines the distance that the insertion region of the second handle can be inserted into the hollow region of the proximal region of the second linking portion. According to an embodiment, the first jaw comprises a step that determines the distance that the insertion region of the first jaw can be inserted into the hollow region of the distal region of the first linking portion, and the second jaw comprises a step that determines the distance that the insertion region of the second jaw can be inserted into the hollow region of the distal region of the second linking portion. According to an embodiment, the first jaw comprises a substantially nonflammable material, and the second jaw comprises a substantially nonflammable material. According to an embodiment, the first handle comprises wood, and wherein the second handle comprises wood. According to an embodiment, the first handle comprises a stop configured to restrict the number of possible orientations of the apparatus, once assembled. According to an embodiment, an outer surface of the first handle comprises a first indicator, an outer surface of the first linking portion comprises a second indicator, an outer surface of the second handle comprises a third indicator, and the outer surface of the second linking portion comprises a fourth indicator, the first indicator matches the second indicator, wherein the third indicator matches the fourth indicator, wherein the first indicator does not match the fourth indicator, and wherein the third indicator does not match the second indicator, the first indicator and the second indicator align to indicate that the first handle and the first linking portion are correctly assembled, and the third indicator and the fourth indicator align to indicate that the second handle and the second linking portion are correctly assembled. According to an embodiment, the apparatus further comprises: a fourth fastener configured to pass through the at least one aperture of the first handle and the at least one aperture of the proximal region of the first linking portion to further secure the first handle to the first linking portion; and a fifth fastener configured to pass through the at least one aperture of the second handle and the at least one aperture of the proximal region of the second linking portion to further secure the second handle to the second linking portion. According to an embodiment, the apparatus further comprises: a sixth fastener configured to pass through the at least one aperture of the first jaw and the at least one aperture of the distal region of the first linking portion to further secure the first jaw to the first linking portion; and a seventh fastener configured to pass through the at least one aperture of the second jaw and the at least one aperture of the distal region of the second linking portion to further secure the second jaw to the second linking portion.

According to embodiments, a method for assembling an apparatus comprises: connecting a first handle with a proximate region of a first linking portion; securing, nonmovably, the first handle to the first linking portion with a first fastener; connecting a second handle with a proximate region of a second linking portion; securing, nonmovably, the second handle to the second linking portion with a second fastener; connecting a first jaw to a distal region of the first linking portion; connecting a second jaw to a distal region of the second linking portion; securing, nonmovably, the first jaw and the first linking portion with a third fastener; securing, nonmovably, the second jaw and the second linking portion with the third fastener; and securing, movably, the first linking portion and the second linking portion with the third fastener. According to an embodiment, the coupling region of the first handle comprises an insertion region, the coupling region of the second handle comprises an insertion region, the coupling region of the proximal region of the first linking portion comprises a hollow region, the coupling region of the distal region of the first linking portion comprises a hollow region, the coupling region of the proximal region of the second linking portion comprises a hollow region, the coupling region of the distal region of the second linking portion comprises a hollow region, the coupling region of the first jaw comprises an insertion region, and the coupling region of the second jaw comprises an insertion region. According to an embodiment, the first handle comprises a step that determines the distance that the insertion region of the first handle can be inserted into the hollow region of the proximal region of the first linking portion, and the second handle comprises a step that determines the distance that the insertion region of the second handle can be inserted into the hollow region of the proximal region of the second linking portion. According to an embodiment, the first jaw comprises a step that determines the distance that the insertion region of the first jaw can be inserted into the hollow region of the distal region of the first linking portion, and the second jaw comprises a step that determines the distance that the insertion region of the second jaw can be inserted into the hollow region of the distal region of the second linking portion. According to an embodiment, the first jaw comprises a substantially nonflammable material, and wherein the second jaw comprises a substantially nonflammable material. According to an embodiment, the first handle comprises wood, and wherein the second handle comprises wood. According to an embodiment, the first handle comprises a stop configured to restrict the number of possible orientations of the apparatus, once assembled. According to an embodiment, an outer surface of the first handle comprises a first indicator, an outer surface of the first linking portion comprises a second indicator, an outer surface of the second handle comprises a third indicator, and the outer surface of the second linking portion comprises a fourth indicator, the first indicator matches the second indicator, the third indicator matches the fourth indicator, the first indicator does not match the fourth indicator, and wherein the third indicator does not match the second indicator, the first indicator and the second indicator align to indicate that the first handle and the first linking portion are correctly assembled, and the third indicator and the fourth indicator align to indicate that the second handle and the second linking portion are correctly assembled. According to an embodiment, the method further comprises: further securing the first handle and the first linking portion with a fourth fastener; and further securing the second handle and the second linking portion with a fifth fastener. According to an embodiment, the method further comprises: further securing the first jaw and the first linking portion with a sixth fastener; and further securing the second jaw and the second linking portion with a seventh fastener.

DETAILED DESCRIPTION

Tongs 100 (e.g., fire tongs for manipulating fuel in a fire) may include a first handle 111, including a proximal region and a distal region. The first handle 111 may include a gripping region in the proximal region of the first handle 111 and a coupling region (e.g., an insertion region or a hollow region) in the distal region of the first handle 111. The gripping region of the first handle 111 may be configured to be gripped by a hand. In the case that the coupling region of the first handle 111 is an insertion region, the insertion region may comprise a step, such that a thickness of the insertion region of the first handle 111 may be less than a thickness of another region of the first handle 111. The coupling region of the first handle 111 comprises at least one aperture, such that a fastener can extend through the thickness of the first handle 111. In the case that the coupling region of the first handle 111 includes a hollow region, the coupling region may include a pair of complimentary apertures on opposite sidewalls, substantially alighted with each other, such that a fastener can extend through the thickness of the first handle 111.

The tongs 100 may include a first jaw 113, including a proximal region and a distal region. The proximal region of the first jaw 113 may include a coupling region including at least one aperture. The at least one aperture of the first jaw 113 may allow a fastener to pass through the thickness of the first jaw 113. In the case that the coupling region of the first jaw 113 includes a hollow region, the at least one aperture includes a pair of complimentary apertures on opposite sidewalls of the first jaw 113, substantially aligned with each other, such that a fastener can extend through the thickness of the first jaw 113. The distal region of the first jaw 113 may include a fuel-engaging feature 114. The first jaw 113 may include or be formed of a substantially nonflammable material, such as nonflammable metal. Such a material may not burn when exposed to a wood-burning fire, or a fire that uses gas (e.g., natural gas) as fuel, such as a conventional gas-burning fire in a home.

Figure 8:
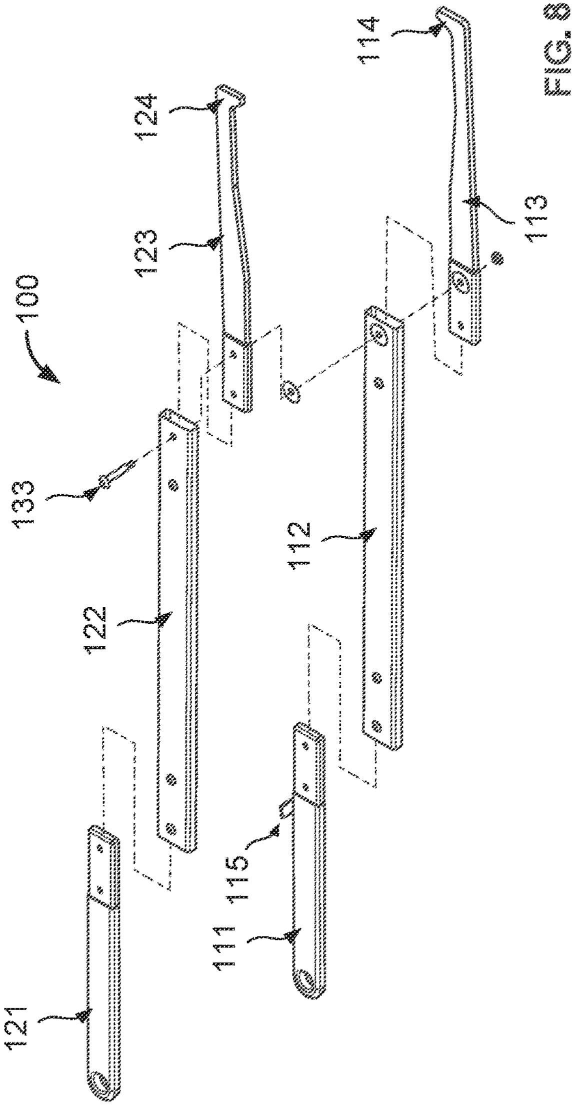
FIG. 8 is an exploded view of an embodiment of the tongs.

The tongs 100 may include a first linking portion 112, including a proximal region and a distal region. The proximal region of the first linking portion 112 may include a coupling region configured to couple with the coupling region of the first handle 111. In the case that the coupling region of the first handle 111 is an insertion region, the coupling region in the proximal region of the first linking portion 112 may be a hollow region. Conversely, in the case that the coupling region of the first handle 111 is a hollow region, the coupling region in the proximal region of the first linking portion 112 may be an insertion region. In this case, the first linking portion 112 may have a step in the proximal region, such that the insertion region has a smaller thickness than other portions of the first linking portion 112. The step may determine the extent that the insertion region of the first linking portion 112 can be inserted into the hollow region of the first handle 111. In the case, the first linking portion 112 may have a step in the proximal region, such that the insertion region has a smaller thickness than other portions of the first linking portion 112. The step may determine the extent that the insertion region of the first linking portion 112 can be inserted into the hollow region of the first handle 111. In the case that the coupling region of the first handle 111 is an insertion region, a step may be provided on the first handle 111 (as shown in FIG. 8), such that the insertion region has a smaller thickness than other portions of the first handle 111. The step may determine the extent that the insertion region of the first handle 111 can be inserted into the hollow region of the proximate region of the first linking portion 112.

The distal region of the first linking portion 112 may include a coupling region configured to receive the coupling region of the first jaw 113. In the case that the coupling region of the first jaw 113 is an insertion region, the coupling region of the distal region of the first linking portion 112 may be a hollow region. In the case that the coupling region of the first jaw 113 is a hollow region, the coupling region of the distal region of the first linking portion 112 may be an insertion region. In this case, the first linking portion 112 may have a step in the distal region, such that the insertion region has a smaller thickness than other portions of the first linking portion 112. The step may determine the extent that the insertion region of the first linking portion 112 can be inserted into the hollow region of the first jaw 113. In the case that the coupling region of the first jaw 113 is an insertion region, a step may be provided on the first jaw 113 (as shown in FIG. 8), such that the insertion region has a smaller thickness than other portions of the first jaw 113. The step may determine the extent that the insertion region of the first jaw 113 can be inserted into the hollow region of the distal region of the first linking portion 112.

The proximal region of the first linking portion 112 may include at least one aperture. The at least one aperture in the proximal region of the first linking portion 112 may permit a fastener to extend through the thickness of the first linking portion 112. In the example where the proximal region of the first linking portion 112 includes a hollow region, the at least one aperture includes an aperture through one sidewall and a complimentary aperture through the opposite sidewall. The pair of apertures are substantially aligned with each other, such that a fastener can extend through a thickness of the first linking portion 112.

The distal region of the first linking portion 112 may include at least one aperture. In the case that the distal region of the first linking portion 112 includes a hollow region, the at least one aperture may include a pair of complimentary apertures, and substantially aligned with each other and on opposite sides of the first linking portion 112, such that a fastener can extend through a thickness of the first linking portion 112.

The tongs 100 may include a first fastener 131 configured to simultaneously pass through the at least one aperture of the first handle 111 and the at least one aperture in the proximal region of the first linking portion 112, such that the first handle 111 and the first linking portion 112 are secured with each other.

The tongs 100 may include a second handle 121, including a proximal region and a distal region. The second handle 121 may include a gripping region towards the proximal region of the second handle 121 and a coupling region towards the distal region of the second handle 121. The gripping region of the second handle 121 may be configured to be gripped by a hand. In the case that the coupling region of the second handle 121 includes an insertion region, the second handle 121 may include a step, such that a thickness of the insertion region of the second handle 121 may be less than a thickness of another region of the second handle 121. The coupling region of the second handle 121 may include at least one aperture. In the case that the coupling region of the second handle 121 is a hollow region, the at least one aperture in the coupling region of the second handle 121 includes a pair of complimentary apertures through opposite sidewalls that are substantially aligned with each other, such that a fastener can pass through the thickness of the second handle 121.

The tongs 100 may include a second jaw 123, including a proximal region and a distal region. The proximal region of the second jaw 123 may include a coupling region comprising at least one aperture. In the case that coupling region of the second jaw 123 includes a hollow region, the at least one aperture includes a pair of complimentary apertures through opposing sidewalls of the second jaw 123, and substantially aligned with each other, such that a fastener can extend through a thickness of the second jaw 123. The distal region of the second jaw 123 may include a fuel-engaging feature 124. The second jaw 123 may include a substantially nonflammable material (e.g., nonflammable metal).

The tongs 100 may include a second linking portion 122, including a proximal region and a distal region. The proximal region of the second linking portion 122 may include a coupling region configured to receive the coupling region of the second handle 121. In the case that the coupling region of the second handle 121 is an insertion region, the coupling region in the proximal region of the second linking portion 122 may be a hollow region. Conversely, in the case that the coupling region of the second handle 121 is a hollow region, the coupling region in the proximal region of the second linking portion 122 may be an insertion region. In this case, the second linking portion 122 may have a step in the proximal region, such that the insertion region has a smaller thickness than other portions of the second linking portion 122. The step may determine the extent that the insertion region of the second linking portion 122 can be inserted into the hollow region of the second handle 121. In the case, the second linking portion 122 may have a step in the proximal region, such that the insertion region has a smaller thickness than other portions of the second linking portion 122. The step may determine the extent that the insertion region of the second linking portion 122 can be inserted into the hollow region of the second handle 121. In the case that the coupling region of the second handle 121 is an insertion region, a step may be provided on the second handle 121 (as shown in FIG. 8), such that the insertion region has a smaller thickness than other portions of the second handle 121. The step may determine the extent that the insertion region of the second handle 121 can be inserted into the hollow region of the proximate region of the second linking portion 122.

The distal region of the second linking portion 122 may include a coupling region configured to receive the coupling region of the second jaw 123. In the case that the coupling region of the second jaw 123 is an insertion region, the coupling region of the distal region of the second linking portion 122 may be a hollow region. In the case that the coupling region of the second jaw 123 is a hollow region, the coupling region of the distal region of the second linking portion 122 may be an insertion region. In this case, the second linking portion 122 may have a step in the distal region, such that the insertion region has a smaller thickness than other portions of the second linking portion 122. The step may determine the extent that the insertion region of the second linking portion 122 can be inserted into the hollow region of the second jaw 123. In the case that the coupling region of the second jaw 123 is an insertion region, a step may be provided on the second jaw 123 (as shown in FIG. 8), such that the insertion region has a smaller thickness than other portions of the second jaw 123. The step may determine the extent that the insertion region of the second jaw 123 can be inserted into the hollow region of the distal region of the second linking portion 122.

The tongs 100 may include a second fastener 132 configured to simultaneously pass through the at least one aperture of the second handle 121, and the at least one aperture in the proximal region of the second linking portion 122, such that the second handle 121 and the second linking portion 122 are secured with each other.

The tongs 100 may include a third fastener 133 configured to simultaneously pass through the at least one aperture of the first jaw 113, the at least one aperture in the distal region of the first linking portion 112, the at least one aperture of the second jaw 123, and the at least one aperture in the distal region of the second linking portion 122, such that the first jaw 113 and the first linking portion 112 are secured with each other, the second jaw 123 and the second linking portion 122 are secured with each other, and the first linking portion 112 and the second linking portion 122 are movably secured with each other. The first jaw 113 and the first linking portion 112 may be immovably secured with respect to each other. The second jaw 123 and the second linking portion 122 may be immovably secured with respect to each other. As shown in FIG. 8, washer may be interposed between the first linking portion 112 and the second linking portion 112. Further, a washer may be interposed between any connection of two portions, as described herein.

The tongs 100 may include one or more of: a fourth fastener 134; a fifth fastener 135; a sixth fastener 136; and a seventh fastener 137. The at least one aperture of the first handle 111 may include two apertures, in the case that the coupling region of the first handle 111 includes an insertion region. In the case that the coupling region of the first handle 111 includes a hollow region, the at least one aperture includes a second pair of complimentary apertures similar to the first pair. The at least one aperture of the second handle 121 may include two apertures, in the case that the coupling region of the second handle 121 includes an insertion region. In the case that the coupling region of the second handle 121 includes a hollow region, the at least one aperture includes a second pair of complimentary apertures similar to the first pair. The at least one aperture of the first jaw 113 includes two apertures, in the case that the coupling region of the first jaw 113 includes an insertion region. In the case that the coupling region of the first jaw 113 includes a hollow region, the at least one aperture includes a second pair of complimentary apertures similar to the first pair. The at least one aperture of the second jaw 123 includes two apertures, in the case that the coupling region of the second jaw 123 includes an insertion region. In the case that the coupling region of the second jaw 123 includes a hollow region, the at least one aperture includes a second pair of complimentary apertures similar to the first pair. The at least one aperture in the proximal region of the first linking portion 112 may include two apertures, in the case that the proximal region of the first linking portion includes an insertion region. In the case that the proximal region of the first linking portion 112 includes a hollow region, the at least one aperture in the proximal region of the first linking portion 112 includes a second pair of apertures, similar to the first pair of apertures, and through which a fastener can be inserted through the thickness of the first linking portion 112. The at least one set of apertures in the distal region of the first linking portion 112 may include a second aperture, in the case that the distal region of the first linking portion 112 includes an insertion region. In the case that the distal region of the first linking portion 112 includes a hollow region, the at least one aperture of the distal region of the first linking portion 112 includes a second pair of apertures, similar to the first pair of apertures, and through which a fastener can be inserted through the thickness of the first linking portion 112. The at least one aperture in the proximal region of the second linking portion 122 may include two apertures, in the case that the proximal region of the second linking portion includes an insertion region. In the case that the proximal region of the second linking portion 122 includes a hollow region, the at least one aperture in the proximal region of the second linking portion 122 includes a second pair of apertures, similar to the first pair of apertures, and through which a fastener can be inserted through the thickness of the second linking portion 122. The at least one set of apertures in the distal region of the second linking portion 122 may include a second aperture, in the case that the distal region of the second linking portion 122 includes an insertion region. In the case that the distal region of the second linking portion 122 includes a hollow region, the at least one aperture of the distal region of the second linking portion 122 includes a second pair of apertures, similar to the first pair of apertures, and through which a fastener can be inserted through the thickness of the second linking portion 122.

The fourth fastener 134 may be configured to simultaneously pass through one of the at least one aperture of the first handle 111, and at least one of the at least one apertures in the proximal region of the first linking portion 112, such that the fourth fastener 134 passes through the thicknesses of the first handle 111 and the first linking portion 112. The fifth fastener 135 may be configured to simultaneously pass through at least one of the at least one aperture of the first jaw 113, and at least one aperture of the at least one apertures in the distal region of the first linking portion 112, such that the fifth fastener 135 passes through the thicknesses of the first jaw 113 and the first linking portion 112.

The sixth fastener 136 may be configured to simultaneously pass through one of the at least one apertures of the second handle 121, and at least one of the at least one apertures in the proximal region of the second linking portion 122, such that the sixth fastener 136 passes through the thicknesses of the second handle 121 and the second linking portion 122. The seventh fastener 137 may be configured to simultaneously pass through at least one of the at least one aperture of the second jaw 123, and at least one aperture of the at least one aperture in the distal region of the second linking portion 122, such that the seventh fastener 137 passes through the thicknesses of the second jaw 123 and the second linking portion 122.

The first handle 111 may include wood. The second handle 121 may include wood. The first handle 111 may include a stop 115 configured to restrict the number of possible orientations of the tongs 100, once assembled. As can be seen in FIG. 1, when the first handle 111 is rotated clockwise, the stop 115 eventually engages with the second handle 121 (or optionally, the second linking portion 122) to prevent further rotation in that direction.

Figure 7:
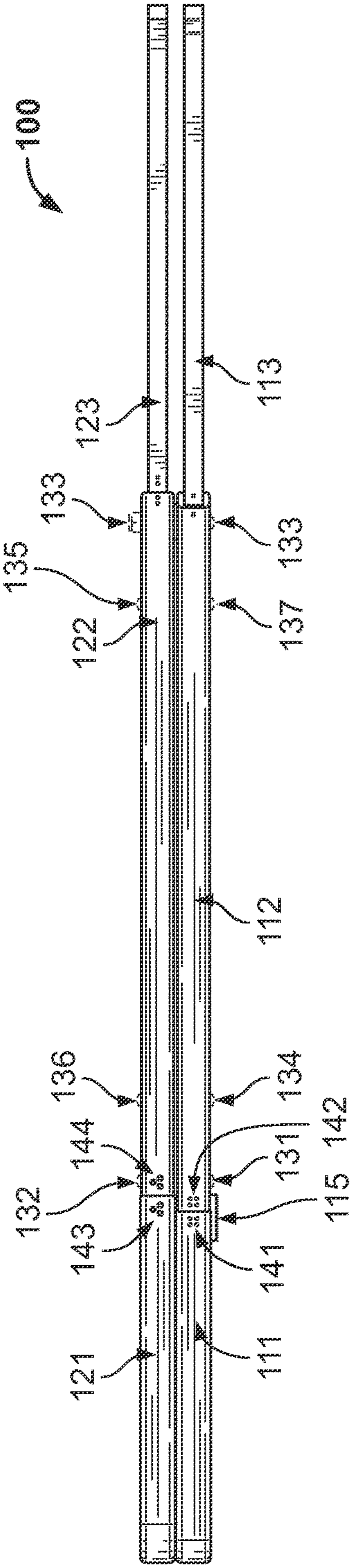
FIG. 7 is a bottom plan view of an embodiment of the tongs.
Figure 9:
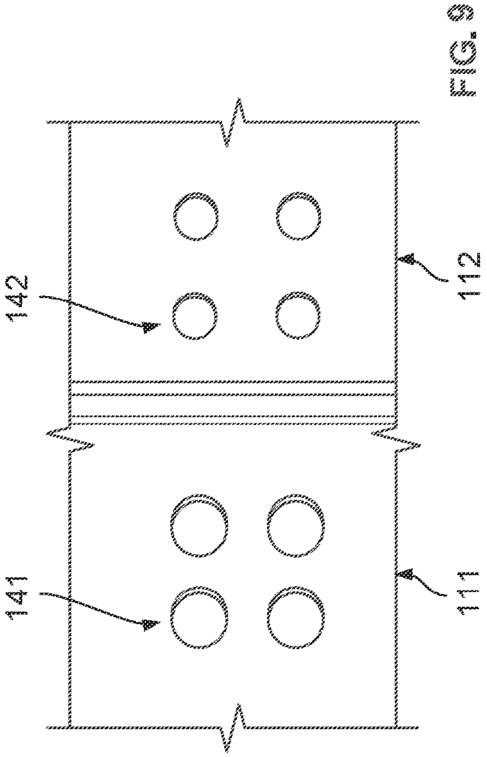
FIG. 9 is a view of indicators, according to an embodiment of the tongs.

Turning to FIGS. 7 and 9, an outer surface of the first handle 111 may include a first indicator 141. An outer surface of the first linking portion 112 may include a second indicator 142. An outer surface of the second handle 121 may include a third indicator 143. The outer surface of the second linking portion 122 may include a fourth indicator 144. The first indicator 141 may match the second indicator 142. The third indicator 143 may match the fourth indicator 144. The first indicator 141 may not match the fourth indicator 144. The third indicator 143 may not match the second indicator 142.

The first indicator 141 may be not on the coupling region of the first handle 111. If a step is included on the first handle 111, the first indicator 141 may be proximate the step, but still visible when the tongs 100 are assembled. The second indicator 142 may be located in the proximate region of the first linking portion 112. If a step is included on the proximate region of the first linking portion 112, the second indicator 142 may be proximate the step, but still visible when the tongs 100 are assembled. When the first handle 111 and the first linking portion 112 are fully coupled (an insertion region is fully received by a hollow region), the first indicator 141 and the second indicator 142 align to indicate that the first handle 111 and the first linking portion 112 are correctly assembled.

The third indicator 143 may be not on the coupling region of the second handle 121. If a step is included on the second handle 121, the third indicator 143 may be proximate the step, but still visible when the tongs 100 are assembled. The fourth indicator 144 may be located in the proximate region of the second linking portion 122. If a step is included on the proximate region of the second linking portion 122, the fourth indicator 144 may be proximate the step, but still visible when the tongs 100 are assembled. When the second handle 121 and the second linking portion 122 are fully coupled (an insertion region is fully received by a hollow region), the third indicator 143 and the fourth indicator 144 align to indicate that the second handle 121 and the second linking portion 122 are correctly assembled.

For embodiments with a step, regardless of whether a step is provided on the first handle 111 or the proximal region of the first linking portion 112, the step may determine the maximum distance when these components are fully coupled (an insertion region is fully received by a hollow region). For embodiments with a step, regardless of whether a step is provided on the second handle 121 or the proximal region of the second linking portion 122, the step may determine the maximum distance when these components are fully coupled (an insertion region is fully received by a hollow region). Generally, a step defines a transition between a narrower insertion region and a wider abutting region. The narrower insertion region is sized to be received by the corresponding hollow region, while the wider abutting region is too thick and/or wide to be received by the corresponding hollow region.

A method of assembling the tongs 100 may be performed as follows. The first handle 111 is connected with the proximate region of the first linking portion 112. For example, an insertion region of the first handle 111 is inserted into a hollow region of the proximate region of the first linking portion 112. A step on the first handle may determine the maximum insertion distance. Conversely, the proximate region of the first linking portion 112 may include an insertion region, while the first handle 111 may include a hollow region. The same principle with a step would apply, if a step is included on the first linking portion 112. A fastener (e.g., screw) is then inserted through at least one aperture in the first handle 111 and at least one aperture in the proximate region of the first linking portion 112, and then secured (e.g., with a nut, such as a cap nut). An additional fastener may be used in a similar manner to further secure the second handle 121 with the proximate region of the second linking portion 122.

The second handle 121 is connected with the proximate region of the second linking portion 122. For example, an insertion region of the second handle 121 is inserted into a hollow region of the proximate region of the second linking portion 122. A step on the second handle 121 may determine the maximum insertion distance. Conversely, the proximate region of the second linking portion 122 may include an insertion region, while the second handle 121 may include a hollow region. The same principle with a step would apply, if a step is included on the second linking portion 122. A fastener (e.g., screw) is then inserted through at least one aperture in the second handle 121 and at least one aperture in the proximate region of the second linking portion 122, and then secured (e.g., with a nut, such as a cap nut). An additional fastener may be used in a similar manner to further secure the second handle 121 with the proximate region of the second linking portion 122.

The first jaw 113 is connected with the distal region of the first linking portion 112. For example, an insertion region of the first jaw 113 is inserted into a hollow region of the distal region of the first linking portion 112. A step on the first jaw 113 may determine the maximum insertion distance. Conversely, the distal region of the first linking portion 112 may include an insertion region, while the first jaw 113 may include a hollow region. The same principle with a step would apply, if a step is included on the first linking portion 112. A fastener (e.g., screw) is then optionally inserted through at least one aperture in the first jaw 113 and at least one aperture in the distal region of the first linking portion 112, and then secured (e.g., with a nut, such as a cap nut).

The second jaw 123 is connected with the distal region of the second linking portion 122. For example, an insertion region of the second jaw 123 is inserted into a hollow region of the distal region of the second linking portion 122. A step on the second jaw 123 may determine the maximum insertion distance. Conversely, the distal region of the second linking portion 122 may include an insertion region, while the second jaw 123 may include a hollow region. The same principle with a step would apply, if a step is included on the second linking portion 122. A fastener (e.g., screw) is then optionally inserted through at least one aperture in the second jaw 123 and at least one aperture in the distal region of the second linking portion 122, and then secured (e.g., with a nut, such as a cap nut).

A fastener (e.g., screw) is inserted through at least one aperture in the first linking portion 112, at least one aperture in the first jaw 113, at least one aperture in the second linking portion 122, and at least one aperture in the second jaw 123, and then secured (e.g., with a nut, such as a cap nut). The fastener may nonmovably secure the first jaw 113 to the first linking portion 112, and may nonmovably secure the second jaw 123 to the second linking portion 122. The fastener may further movably secure the first linking portion 112 with the second linking portion 122.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. An apparatus, comprising:

a first handle, including a proximal region and a distal region, wherein the first handle includes a gripping region towards the proximal region of the first handle and a coupling region towards the distal region of the first handle, wherein the gripping region of the first handle is configured to be gripped by a hand, and wherein the coupling region of the first handle comprises at least one aperture;

a first jaw, including a proximal region and a distal region, wherein the proximal region of the first jaw comprises a coupling region including at least one aperture, wherein the distal region of the first jaw comprises a fuel-engaging feature;

a first linking portion, including a proximal region including a coupling region and a distal region including a coupling region, wherein the proximal region of the first linking portion comprises at least one aperture, wherein the distal region of the first linking portion comprises at least one aperture;

a first fastener configured to simultaneously pass through the at least one aperture of the first handle and the at least one aperture of the proximal region of the first linking portion, such that the first handle and the first linking portion are secured with each other;

a second handle, including a proximal region and a distal region, wherein the second handle includes a gripping region towards the proximal region of the second handle and a coupling region towards the distal region of the second handle, wherein the gripping region of the second handle is configured to be gripped by a hand, and wherein the coupling region of the second handle comprises at least one aperture;

a second jaw, including a proximal region and a distal region, wherein the proximal region of the second jaw comprises a coupling region including at least one aperture, wherein the distal region of the second jaw comprises a fuel-engaging feature;

a second linking portion, including a proximal region including a coupling region and a distal region including a coupling region, wherein the proximal region of the second linking portion comprises at least one aperture, wherein the distal region of the second linking portion comprises at least one aperture;

a second fastener configured to simultaneously pass through the at least one aperture of the second handle and the at least one aperture of the proximal region of the second linking portion, such that the second handle and the second linking portion are secured with each other; and a third fastener configured to simultaneously pass through the at least one aperture of the first jaw, the at least one aperture of the distal region of the first linking portion, the at least one aperture of the second jaw, the at least one aperture of the distal region of the second linking portion, such that the first jaw and the first linking portion are secured with each other, the second jaw and the second linking portion are secured with each other, and the first linking portion and the second linking portion are movably secured with each other.

2. The apparatus of claim 1, wherein the coupling region of the first handle comprises an insertion region, the coupling region of the second handle comprises an insertion region, the coupling region of the proximal region of the first linking portion comprises a hollow region, the coupling region of the distal region of the first linking portion comprises a hollow region, the coupling region of the proximal region of the second linking portion comprises a hollow region, the coupling region of the distal region of the second linking portion comprises a hollow region, the coupling region of the first jaw comprises an insertion region, and the coupling region of the second jaw comprises an insertion region.

3. The apparatus of claim 2, wherein the first handle comprises a step that determines the distance that the insertion region of the first handle can be inserted into the hollow region of the proximal region of the first linking portion, and wherein the second handle comprises a step that determines the distance that the insertion region of the second handle can be inserted into the hollow region of the proximal region of the second linking portion.

4. The apparatus of claim 2, wherein the first jaw comprises a step that determines the distance that the insertion region of the first jaw can be inserted into the hollow region of the distal region of the first linking portion, and wherein the second jaw comprises a step that determines the distance that the insertion region of the second jaw can be inserted into the hollow region of the distal region of the second linking portion.

5. The apparatus of claim 1, wherein the first jaw comprises a substantially nonflammable material, and wherein the second jaw comprises a substantially nonflammable material.

6. The apparatus of claim 1, wherein the first handle comprises wood, and wherein the second handle comprises wood.

7. The apparatus of claim 1, wherein the first handle comprises a stop configured to restrict the number of possible orientations of the apparatus, once assembled.

8. The apparatus of claim 1, wherein:

an outer surface of the first handle comprises a first indicator, wherein an outer surface of the first linking portion comprises a second indicator, wherein an outer surface of the second handle comprises a third indicator, and wherein the outer surface of the second linking portion comprises a fourth indicator, wherein the first indicator matches the second indicator, wherein the third indicator matches the fourth indicator, wherein the first indicator does not match the fourth indicator, and wherein the third indicator does not match the second indicator, wherein the first indicator and the second indicator align to indicate that the first handle and the first linking portion are correctly assembled, and wherein the third indicator and the fourth indicator align to indicate that the second handle and the second linking portion are correctly assembled.

9. The apparatus of claim 1, further comprising:

a fourth fastener configured to pass through the at least one aperture of the first handle and the at least one aperture of the proximal region of the first linking portion to further secure the first handle to the first linking portion; and a fifth fastener configured to pass through the at least one aperture of the second handle and the at least one aperture of the proximal region of the second linking portion to further secure the second handle to the second linking portion.

10. The apparatus of claim 1, further comprising:

a sixth fastener configured to pass through the at least one aperture of the first jaw and the at least one aperture of the distal region of the first linking portion to further secure the first jaw to the first linking portion; and a seventh fastener configured to pass through the at least one aperture of the second jaw and the at least one aperture of the distal region of the second linking portion to further secure the second jaw to the second linking portion.

11. A method for assembling an apparatus, comprising:

connecting a first handle with a proximate region of a first linking portion;

securing, nonmovably, the first handle to the first linking portion with a first fastener;

connecting a second handle with a proximate region of a second linking portion;

securing, nonmovably, the second handle to the second linking portion with a second fastener;

connecting a first jaw to a distal region of the first linking portion;

connecting a second jaw to a distal region of the second linking portion;

securing, nonmovably, the first jaw and the first linking portion with a third fastener;

securing, nonmovably, the second jaw and the second linking portion with the third fastener; and securing, movably, the first linking portion and the second linking portion with the third fastener.

12. The method of claim 11, wherein the coupling region of the first handle comprises an insertion region, the coupling region of the second handle comprises an insertion region, the coupling region of the proximal region of the first linking portion comprises a hollow region, the coupling region of the distal region of the first linking portion comprises a hollow region, the coupling region of the proximal region of the second linking portion comprises a hollow region, the coupling region of the distal region of the second linking portion comprises a hollow region, the coupling region of the first jaw comprises an insertion region, and the coupling region of the second jaw comprises an insertion region.

13. The method of claim 12, wherein the first handle comprises a step that determines the distance that the insertion region of the first handle can be inserted into the hollow region of the proximal region of the first linking portion, and wherein the second handle comprises a step that determines the distance that the insertion region of the second handle can be inserted into the hollow region of the proximal region of the second linking portion.

14. The method of claim 12, wherein the first jaw comprises a step that determines the distance that the insertion region of the first jaw can be inserted into the hollow region of the distal region of the first linking portion, and wherein the second jaw comprises a step that determines the distance that the insertion region of the second jaw can be inserted into the hollow region of the distal region of the second linking portion.

15. The method of claim 11, wherein the first jaw comprises a substantially nonflammable material, and wherein the second jaw comprises a substantially nonflammable material.

16. The method of claim 11, wherein the first handle comprises wood, and wherein the second handle comprises wood.

17. The method of claim 11, wherein the first handle comprises a stop configured to restrict the number of possible orientations of the apparatus, once assembled.

18. The method of claim 11, wherein:

an outer surface of the first handle comprises a first indicator, wherein an outer surface of the first linking portion comprises a second indicator, wherein an outer surface of the second handle comprises a third indicator, and wherein the outer surface of the second linking portion comprises a fourth indicator, wherein the first indicator matches the second indicator, wherein the third indicator matches the fourth indicator, wherein the first indicator does not match the fourth indicator, and wherein the third indicator does not match the second indicator, wherein the first indicator and the second indicator align to indicate that the first handle and the first linking portion are correctly assembled, and wherein the third indicator and the fourth indicator align to indicate that the second handle and the second linking portion are correctly assembled.

19. The method of claim 11, further comprising:

further securing the first handle and the first linking portion with a fourth fastener; and further securing the second handle and the second linking portion with a fifth fastener.

20. The method of claim 11, further comprising:

further securing the first jaw and the first linking portion with a sixth fastener; and further securing the second jaw and the second linking portion with a seventh fastener.

* * * * *